(12) United States Patent
Deanna

(10) Patent No.: US 7,124,933 B2
(45) Date of Patent: Oct. 24, 2006

(54) AGRICULTURAL CONVERTER CALCULATOR

(76) Inventor: Aikens Deanna, Box 1-5, Hearne, SK (CA) S0H 1Z0

(*) Notice: Subject to any disclaimer, the term of this patent is extended or adjusted under 35 U.S.C. 154(b) by 28 days.

(21) Appl. No.: 10/878,602

(22) Filed: Jun. 29, 2004

(65) Prior Publication Data
US 2005/0001023 A1    Jan. 6, 2005

(30) Foreign Application Priority Data
Jul. 2, 2003    (CA)    .................... 2434095

(51) Int. Cl.
*G06F 17/00* (2006.01)
(52) U.S. Cl. .................... 235/375; 235/61 R
(58) Field of Classification Search ................ 235/375, 235/61 R, 60.18, 60.22, 58 M
See application file for complete search history.

(56) References Cited

U.S. PATENT DOCUMENTS

| | | | |
|---|---|---|---|
| 3,231,189 A | 1/1966 | Barham | |
| 4,092,523 A | 5/1978 | Tava et al. | |
| 4,686,643 A | 8/1987 | Ishiwata | |
| 5,101,368 A * | 3/1992 | Kaplan | 708/206 |
| 5,371,694 A | 12/1994 | Kawawaki et al. | |
| D406,271 S | 3/1999 | Henriksen | |
| 2004/0258807 A1* | 12/2004 | Pape et al. | 426/132 |

* cited by examiner

*Primary Examiner*—Karl D. Frech
(74) *Attorney, Agent, or Firm*—Castellano Malm Ferrario & Buck PLLC

(57) ABSTRACT

An electronic calculator apparatus converts between bushel measures of a selected crop product and weight measures of the selected crop product. The apparatus comprises a microprocessor and a keyboard comprising a numerical portion, a crop product portion, and a conversion portion operative to transmit to the microprocessor respective numerical, crop product, and conversion data inputs selected by a user. The microprocessor is programmed with known arithmetical relationships between bushel measures of selected crop products and corresponding weight measures of the selected crop products and is operative to receive the numerical, crop product, and conversion data inputs and to provide a data output corresponding to a desired conversion between bushel measures and weight measures. A display is coupled to the microprocessor and is operative to display the data inputs and data output to a user.

8 Claims, 2 Drawing Sheets

AGRICULTURAL CONVERTER CALCULATOR

FIELD OF THE INVENTION

This invention relates to the field of calculators, more specifically to a conversion calculator capable of performing conversion between various types of units commonly used in the handling of agricultural products.

DESCRIPTION OF THE PRIOR ART

A common problem in agriculture is the handling of agricultural products, each of which may be defined for various purposes using various units of weight or volume for a single product. For seeds and grains, the unit of measure for the producer has traditionally been bushels, a measure of volume. Today, bushels are defined as a particular number of pounds for any given agricultural seed or grain, generally based on the traditional volume bushel and an average density of the seed or grain in question. For example a bushel of wheat or peas is defined as 60 pounds, while a bushel of barley is 48 pounds, and a bushel of canola is 50 pounds.

Adding to this problem is the use of either U.S., Imperial, or metric measurements in various jurisdictions, and the farmer's retention of the conventional units of bushels, pounds, acres, and so forth. The bushel measure has remained popular, likely because it is an amount that older farmers have a feel for. This leads to problems where farmers, for example when planting, may purchase seed in metric tonnes and then seed the land at an application rate in bushels per acre. Or a farmer may know he has about 300 bushels of a crop product, such as wheat, barley, canola or the like, and need to know if that is enough to seed 200 acres at 75 pounds an acre.

Furthermore, in order to predict and maximize the income from, and control the expense of, farming operations, it is desirous to be able to apply the ever-changing market price for a unit of any particular agricultural product to either the total amount one has for sale, or the total amount one will need for any particular purpose.

Taken together, a large number of critical calculations involving conversion from a bushel measure to a weight measure, or vice versa, are required in the day-to-day operation of a modem farm. Presently most farm operators either perform such calculations by hand, using simple calculators, or by reference sheets. In the modem farm, with diverse farm production of a number of crops, these hand methods are impractical, slow, and prone to error.

For example, one such calculation might be the expected gross income from 600 acres of land with an expected yield of 25 bushels of wheat per acre, where the market price is listed in dollars per metric tonne. To make this calculation requires a conversion from bushels to the corresponding number of metric tonnes, a multiplication of the result of that conversion by the number of acres, and then a further multiplication by the current market price for a tonne of wheat.

Another example might be in making calculations of how much seed it will take to plant a particular number of acres of land. The seed is sold by the bushel or tonne, while the amount to be applied is often described in terms of pounds per acre. Again, a complex series of calculations must presently be carried out in order to make the correct determination of the amount of seed required. Errors in these types of calculations can have a significant negative impact on a farming operation.

A variety of electronic calculators capable of performing unit conversion calculations have been described in the prior art. For example, Tave et al. (U.S. Pat. No. 4,092,523) discloses a conversion calculator capable of performing the conversion of a variety of values in one unit to a value of another unit. Henriksen (U.S. Pat. No. Des. 406,271) discloses a calculator that can convert units of food consumed into calories, such that the user can determine their intake of calories. Kawawaki et al., (U.S. Pat. No. 5,371,694) describe an electronic calculator that performs trigonometric, geometric and other mathematical conversions. Ishiwata et al., (U.S. Pat. No. 4,686,643) discloses an electronic calculator that performs various distance and weight conversions.

With respect to calculators designed for use in solving calculation problems unique to agriculture, Barham (U.S. Pat. No. 3,231,189) discloses a non-electronic circular slide rule-like device. In the Barham invention though, the calculator is concerned with the calculation of the number of acres comprising a field of given length and width, as well as to determine the number of passes swathers of various widths would have to make to cover the same. However, the Barham invention does not, and cannot, be adapted to the types of calculations as have been described above, namely the conversion between bushel measures and weight measures.

SUMMARY OF THE INVENTION

It is an object of the present invention to provide an electronic calculator apparatus for converting between bushel measures of a selected crop product and weight measures of the selected crop product, and performing calculations incorporating the conversions.

The invention provides an electronic calculator apparatus for converting between bushel measures of a selected crop product and weight measures of the selected crop product. The apparatus comprises a microprocessor and a keyboard comprising a numerical portion, a crop product portion, and a conversion portion operative to transmit to the microprocessor respective numerical, crop product, and conversion data inputs selected by a user. The microprocessor is programmed with known arithmetical relationships between bushel measures of selected crop products and corresponding weight measures of the selected crop products and is operative to receive the numerical, crop product, and conversion data inputs and to provide a data output corresponding to a desired conversion between bushel measures and weight measures. A display is coupled to the microprocessor and is operative to display the data inputs and data output to a user.

The desired conversions can further comprise price conversions. Conveniently the numerical and crop product portions of the keyboard can utilize the same keys, and further comprise a function selector key operative to select a numerical function or a crop product function for the keys. The display can conveniently comprise a liquid crystal device, an array of light-emitting diodes or other such suitable devices for the display of digital information. The calculator can be powered by a battery, solar cell, household current, or the like, and can include a light to facilitate use in low light level conditions.

In this way an electronic calculator is provided which overcomes the limitations of the prior art methods of calculators used for performing conversion calculations with respect to agricultural products, by providing an electronic calculator capable of conversion between bushel measures and weight measures for crop products.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE INVENTION

Figure 1:
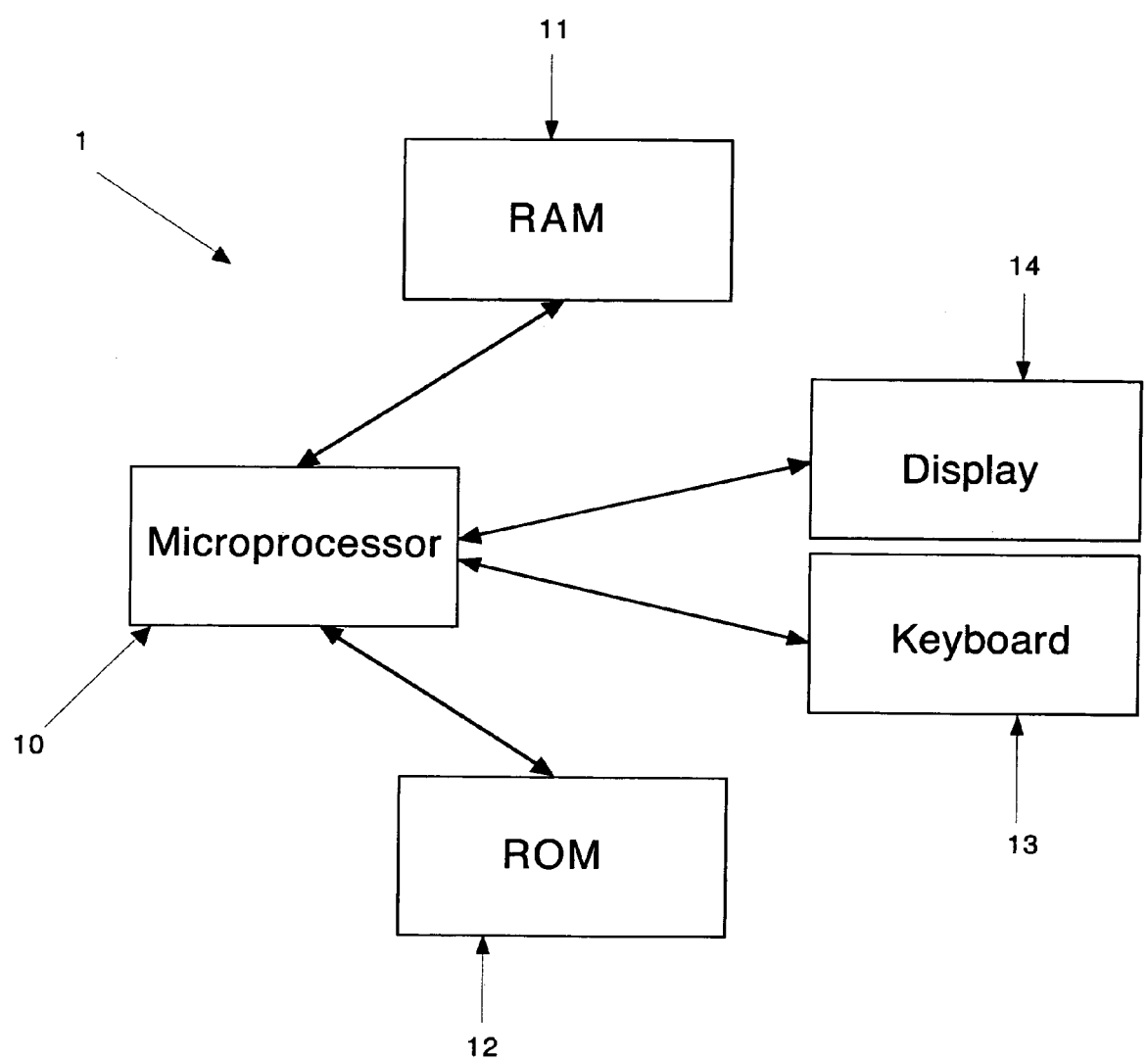
FIG. 1 is a schematic view of the major components of an embodiment the invention.

FIG. 1 illustrates an embodiment of the present invention for use as an electronic calculator in performing conversions between bushel and weight measures of crop products. The calculator comprises a data processing unit 1, consisting of a microprocessor 10, a random-access memory (RAM) storage device 11, a read-only memory (ROM) storage device 12. The microprocessor 10 consists of a typical integrated circuit design, along with the associated electronic components used in the design and operation of integrated circuits. The precise design and nature of the microprocessor 10 will be readily apparent to one skilled in the art of integrated circuit and microprocessor design and construction. The microprocessor 10 is programmed to provide, depending on the data inputs, a data output corresponding to the desired conversion between bushel measures and weight measures.

Figure 2:
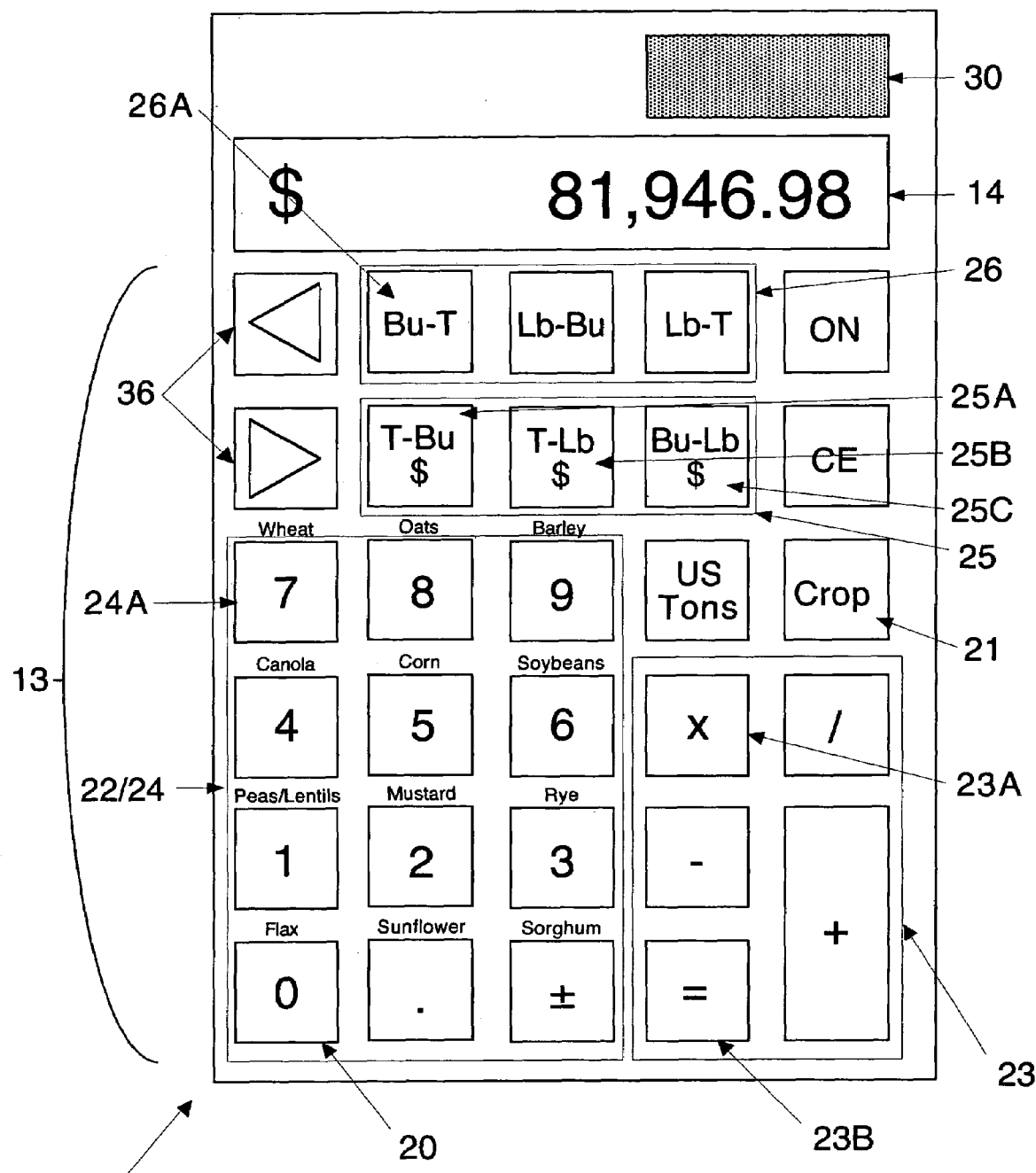
FIG. 2 is a schematic representation of the keyboard and display components of the embodiment of FIG. 1.

FIG. 2 illustrates one embodiment of a keyboard 13 and display 14. The keyboard 13 comprises a plurality of individual keys 20 together comprising a numerical portion 22, a crop product portion 24, and a conversion portion 26 operative to transmit to the microprocessor 10 respective numerical, crop product, and conversion data inputs selected by a user. The keyboard 13 also contains one or more function keys 21.

As shown in FIG. 2, the numerical portion 22 and crop product portion 24 of the keyboard utilize the same keys. Thus, the keyboard 13 further comprises one or more function selector keys 21 operative to select whether a key 20 will transmit a numerical function or a crop product function to the microprocessor 10. For example the key marked "5" and "corn" will transmit the number 5 to the microprocessor 10, or if the function selector key 21 is pressed first, the same key will transmit to the microprocessor 10 an indication that the conversion is for the crop product corn.

In the illustrated embodiment, the keyboard 13 may also comprise keys for basic mathematical functions 23, such as multiply, divide, add, subtract, and other conventional calculator operations.

The display 14 may be an LCD-type display or other conventional display medium, and is operative to display the data inputs and data output to a user.

Also shown in FIG. 2 is a representation of a solar cell 30 intended to operate as a power source for the invention. Other power sources suitable for microprocessor-type electronic applications such as batteries, or household alternating current processed using a transformed, are also power sources that could be used in various embodiments of the invention.

The illustrated embodiment of the calculator includes price conversion keys 25 for converting prices between various measures. Key 25A is operative to convert between dollars per bushel and dollars per tonne. Key 25B is operative to convert between dollars per pound and dollars per tonne. Key 25C is operative to convert between dollars per bushel and dollars per pound.

In the example above the farmer wished to determine the gross income from 600 acres of land with an expected yield of 25 bushels of wheat per acre, where the market price is, for example, listed as 200 dollars per metric tonne.

The farmer enters "600" on the numerical function keys 22, then the multiplication key 23A, then "25" on the numerical function keys 22, then the equals key 23B. A result of 15,000 will be displayed on the display 14. The farmer then pushes the function selector key 21, followed by the dual function ("wheat" and "7") key 24A, followed by a conversion direction key 36, and then the conversion key 26A (bushels/metric tones). The display 14 will then show 408.23. The farmer then pushes the multiplication key 23A, and then enters "200" (the price per tonne) on the numerical function keys 22, then equals key 23B. The display will show 81,646, which is the total dollar value of the crop.

Alternately, the farmer can enter the price per tonne, "200" on the numerical function keys 22, followed by a conversion direction key 36, and then the price conversion key 25A ($bushels/$metric tonne). The display will then show $5.44, which is the price per bushel. The farmer can then multiply by the yield "25" to calculate the dollar return per acre as $136.07, and then multiply by 600 (acres) to get the total dollar return of 81,646. Rounding may occur as set up in the program.

By programming the bushel measures to weight measures into the calculator, the process is simplified and the likelihood of error is reduced.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. An electronic calculator apparatus for converting between bushel measures of a selected crop product and weight measures of the selected crop product, the apparatus comprising:
    a microprocessor;
    a keyboard comprising a numerical portion, a crop product portion, and a conversion portion operative to transmit to the microprocessor respective numerical, crop product, and conversion data inputs selected by a user;
    wherein the microprocessor is programmed with known arithmetical relationships between bushel measures of selected crop products and corresponding weight measures of the selected crop products and is operative to receive the numerical, crop product, and conversion data inputs and to provide a data output corresponding to a desired conversion between bushel measures and weight measures; and
    a display coupled to the microprocessor and operative to display the data inputs and data output to a user;

wherein the microprocessor, keyboard, and display are integrated to form a handheld electronic calculator, and wherein the numerical and crop product portions of the keyboard utilize the same keys, and wherein the keyboard further comprises a function selector key operative to select a numerical function or a crop product function for the keys.

2. The apparatus of claim 1 wherein the microprocessor comprises a read-only memory (ROM) device connected to, and controlling the operation of, the microprocessor; and a random-access memory (RAM) device connected to the microprocessor for storing digital information.

3. The apparatus of claim 1 wherein a power source for the calculator is selected from the group consisting of a battery, a solar cell, and household current.

4. The apparatus of claim 1 wherein the desired conversion includes a price conversion between various volume or weight measures.

5. The apparatus of claim 1 wherein the desired conversion includes a conversion between US tons and metric tonnes.

6. The apparatus of claim 1 wherein the display comprises a liquid crystal device.

7. The apparatus of claim 1 wherein the display comprises an array of light-emitting diodes.

8. The apparatus of claim 1 wherein the display comprises a light operative to facilitate operation in low light level conditions.

* * * * *